W. C. TUTHILL.
MACHINE FOR APPLYING SAND, POWDER, OR SIMILAR SUBSTANCES TO MOLDS.
APPLICATION FILED JULY 14, 1917.
1,250,531.
Patented Dec. 18, 1917.
9 SHEETS—SHEET 1.
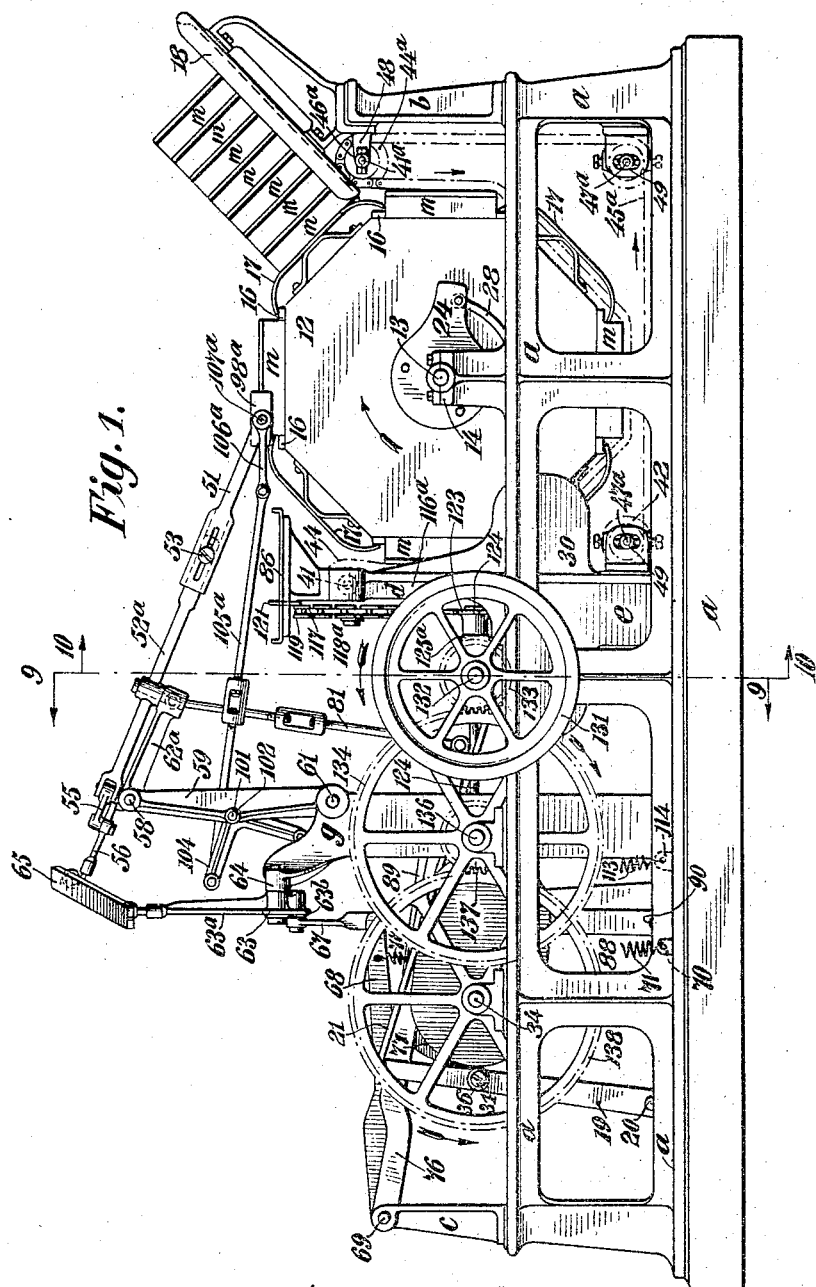

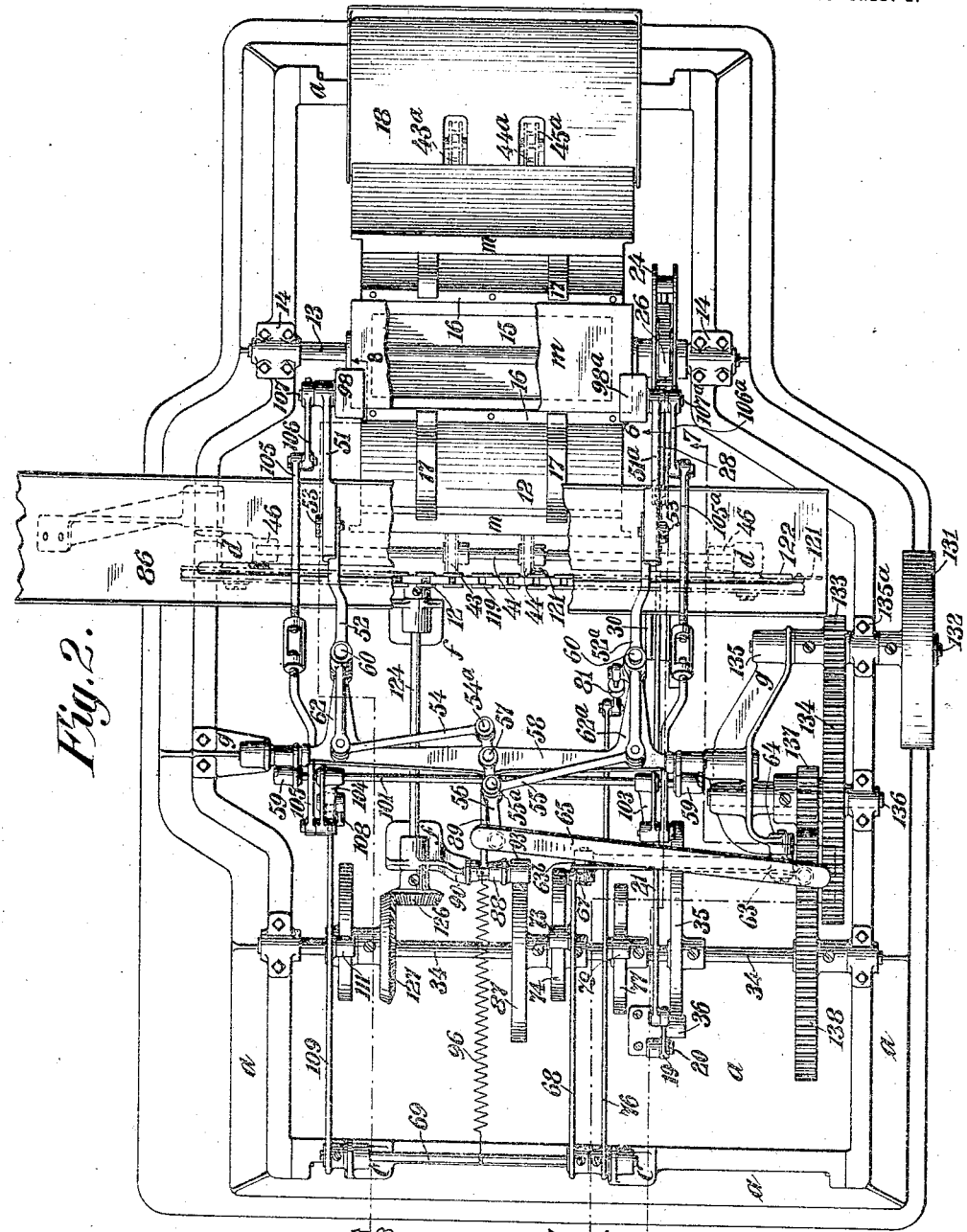

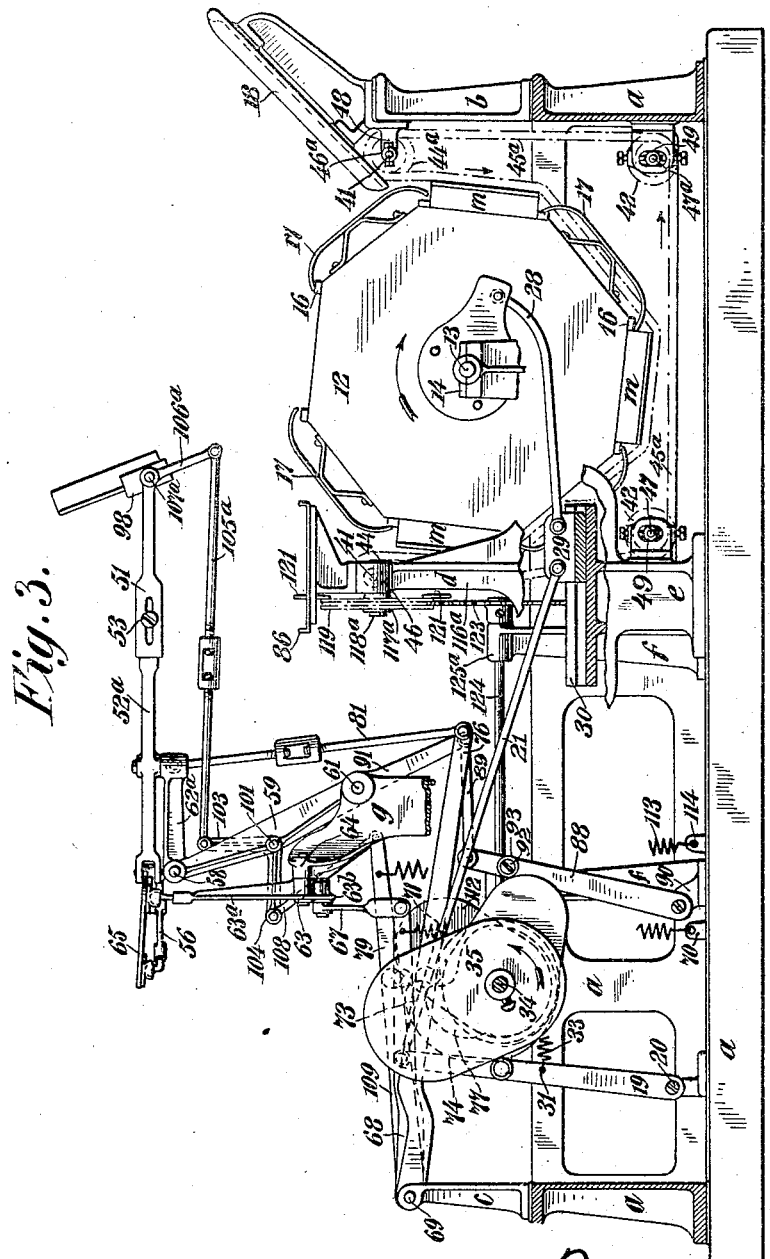

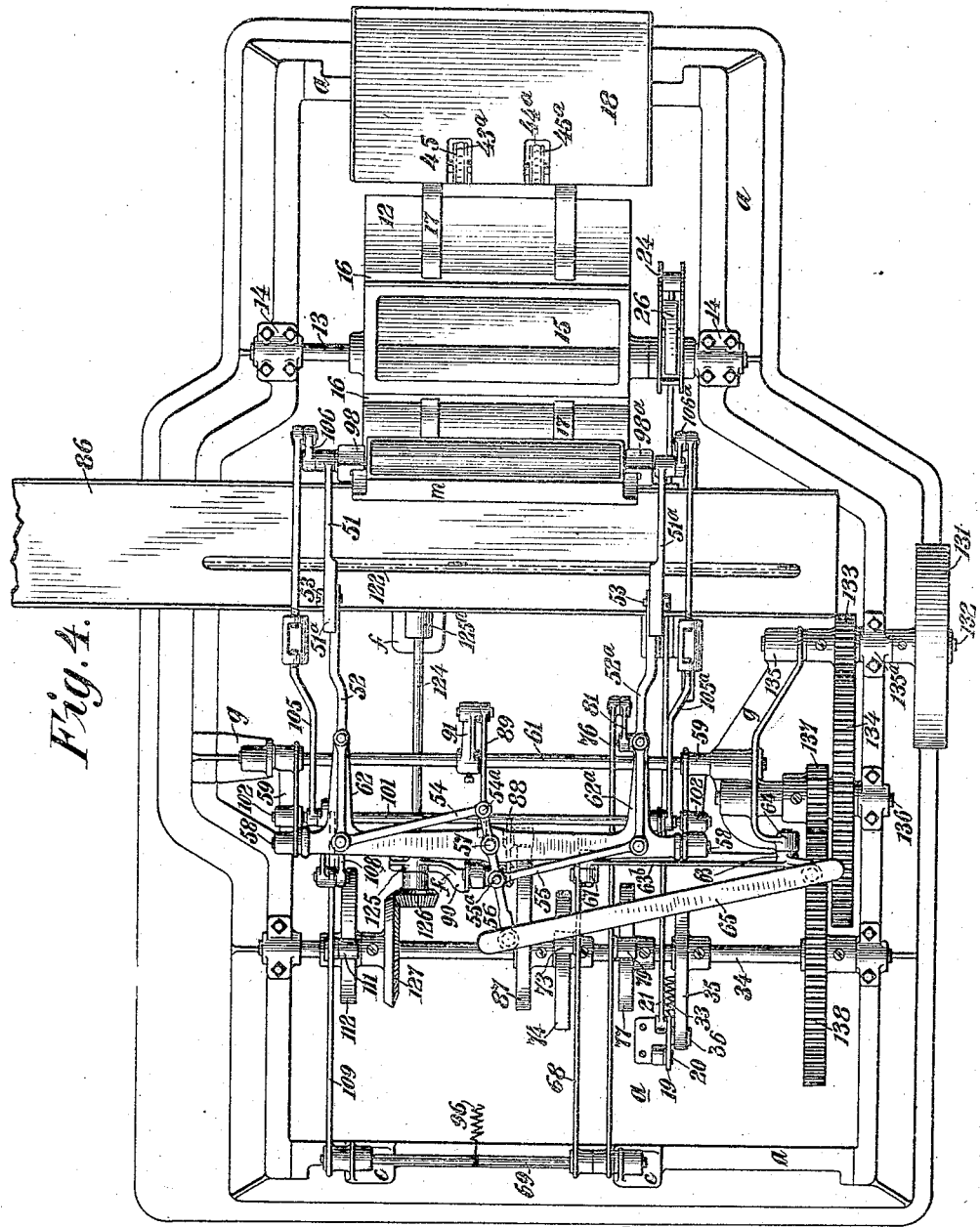

W. C. TUTHILL.
MACHINE FOR APPLYING SAND, POWDER, OR SIMILAR SUBSTANCES TO MOLDS.
APPLICATION FILED JULY 14, 1917.
1,250,531.
Patented Dec. 18, 1917.
9 SHEETS—SHEET 5.
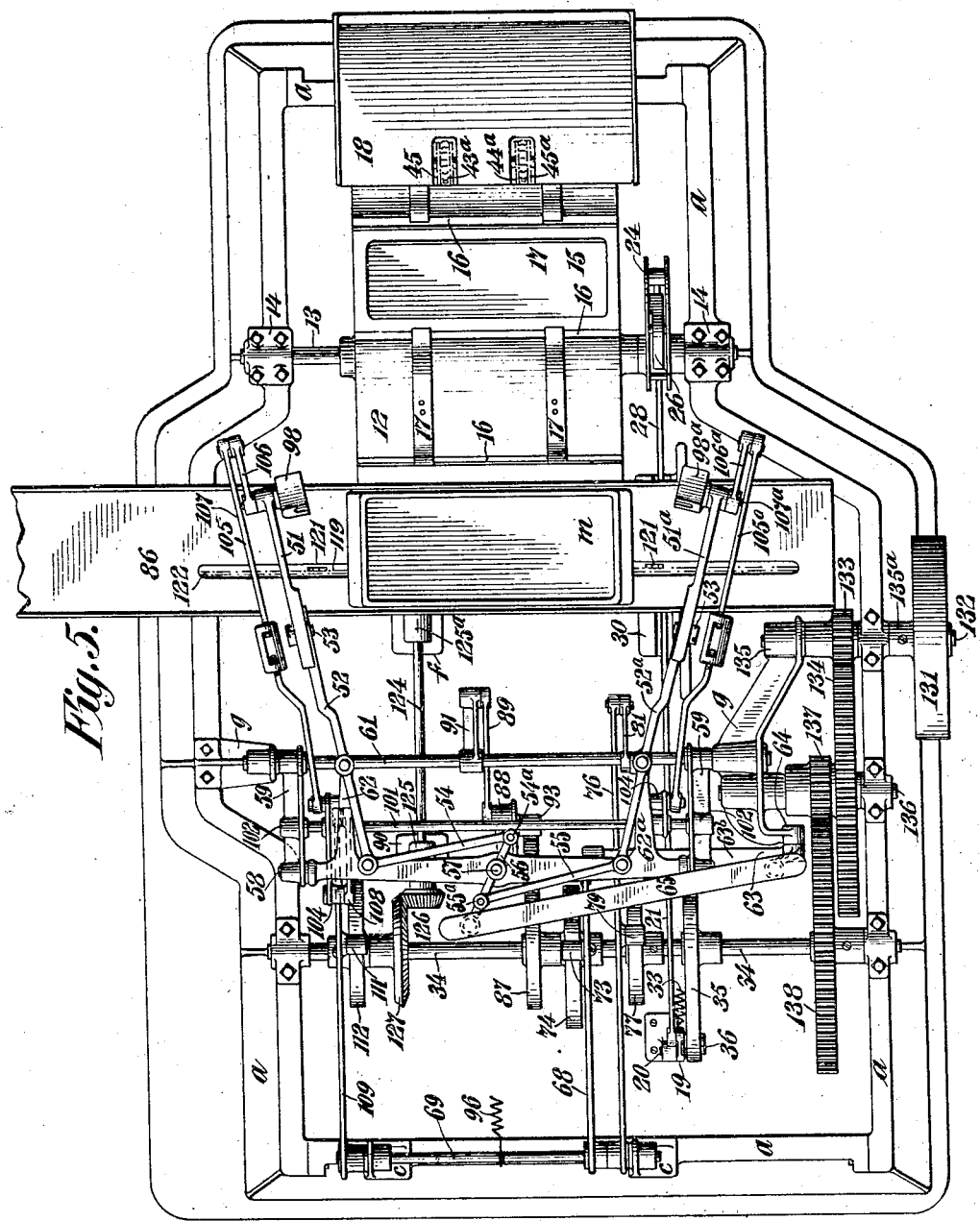

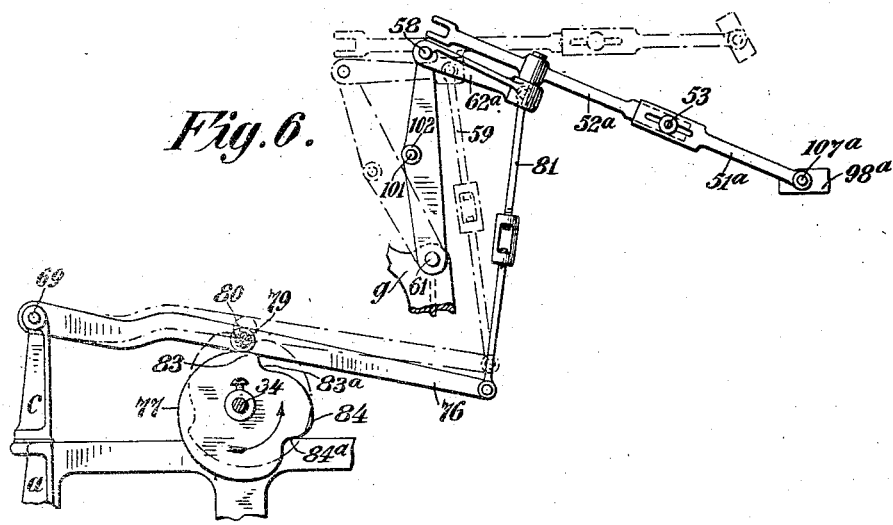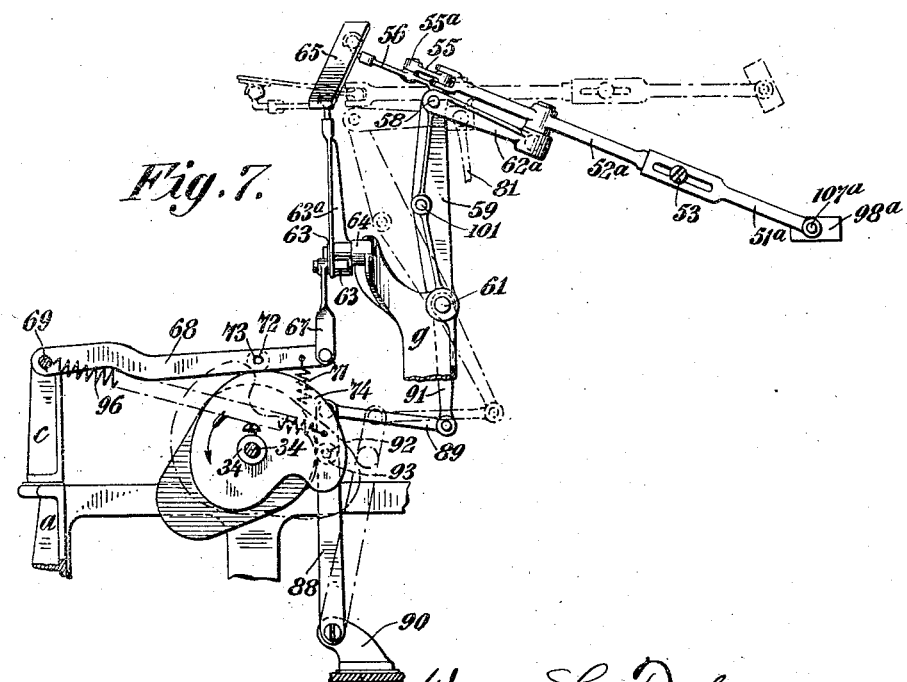

W. C. TUTHILL.
MACHINE FOR APPLYING SAND, POWDER, OR SIMILAR SUBSTANCES TO MOLDS.
APPLICATION FILED JULY 14, 1917.

1,250,531.

Patented Dec. 18, 1917.
9 SHEETS—SHEET 7.

Witnesses:
Fred. Roeger
Louise Keller

William C. Tuthill, Inventor
By Henry Schreiter his Attorney

W. C. TUTHILL.
MACHINE FOR APPLYING SAND, POWDER, OR SIMILAR SUBSTANCES TO MOLDS.
APPLICATION FILED JULY 14, 1917.

1,250,531.

Patented Dec. 18, 1917.
9 SHEETS—SHEET 8.

Witnesses:
Fred. Rager.
Louise Keller.

William C. Tuthill, Inventor
By Henry Schreiter, his Attorney

W. C. TUTHILL.
MACHINE FOR APPLYING SAND, POWDER, OR SIMILAR SUBSTANCES TO MOLDS.
APPLICATION FILED JULY 14, 1917.

1,250,531.

Patented Dec. 18, 1917.
9 SHEETS—SHEET 9.

Witnesses:
Fred Krega
Louise Keller

William C. Tuthill, Inventor
By Henry Schreiter his Attorney

UNITED STATES PATENT OFFICE.

WILLIAM C. TUTHILL, OF LONG ISLAND CITY, NEW YORK.

MACHINE FOR APPLYING SAND, POWDER, OR SIMILAR SUBSTANCES TO MOLDS.

1,250,531. Specification of Letters Patent. Patented Dec. 18, 1917.

Application filed July 14, 1917. Serial No. 180,588.

*To all whom it may concern:*

Be it known that I, WILLIAM C. TUTHILL, a citizen of the United States, and resident of Long Island City, county of Queens, and State of New York, have invented certain new and useful Improvements in Machines for Applying Sand, Powder, or Similar Substances to Molds, of which the following is a full, clear, and exact specification, reference being had to the accompanying drawings, illustrating a machine constructed in accordance with my invention, and wherein—

Figure 1 is a side view, and Fig. 2 a plan view, of the machine; the parts thereof being shown in these views in their relative positions when the arms carrying the jaws have gripped the mold still setting upon the drum;

Figs. 3 and 4 are a side view and a plan view like Figs. 1 and 2 respectively, but showing the parts in their relative positions when the arms carrying the jaws have been receded with the mold raised from the drum; the jaws, gripping the mold, and the mold, being partially turned;

Fig. 5 is also a plan view like Fig. 2, but showing the parts in their relative positions when the arms carrying the jaws are lowered in their receded position and moved apart, the mold being thereby disengaged from the jaws and deposited on the runway;

Figure 8:
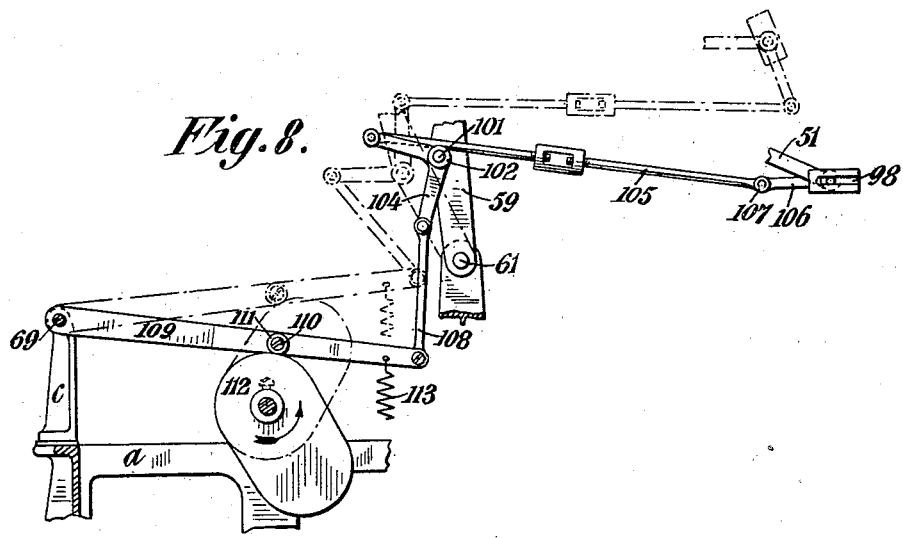
Figure 11:
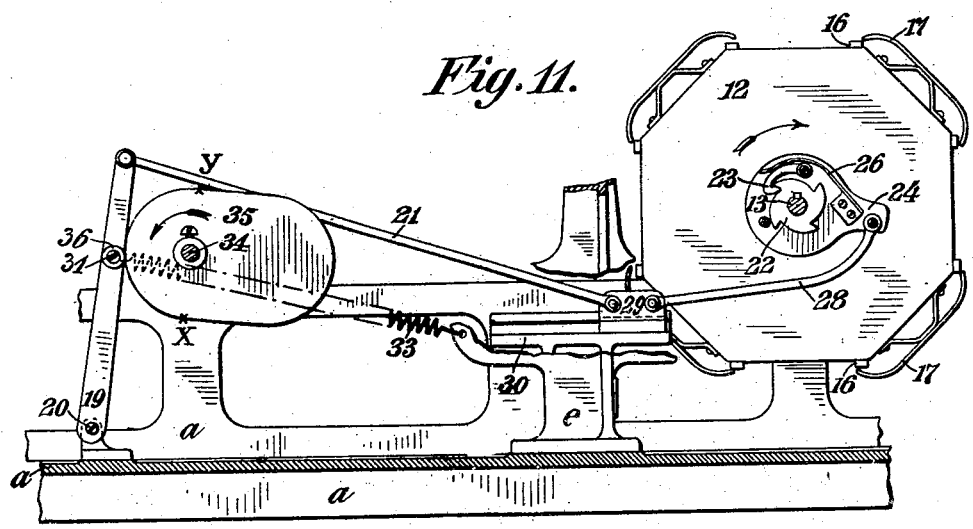
Figure 9:
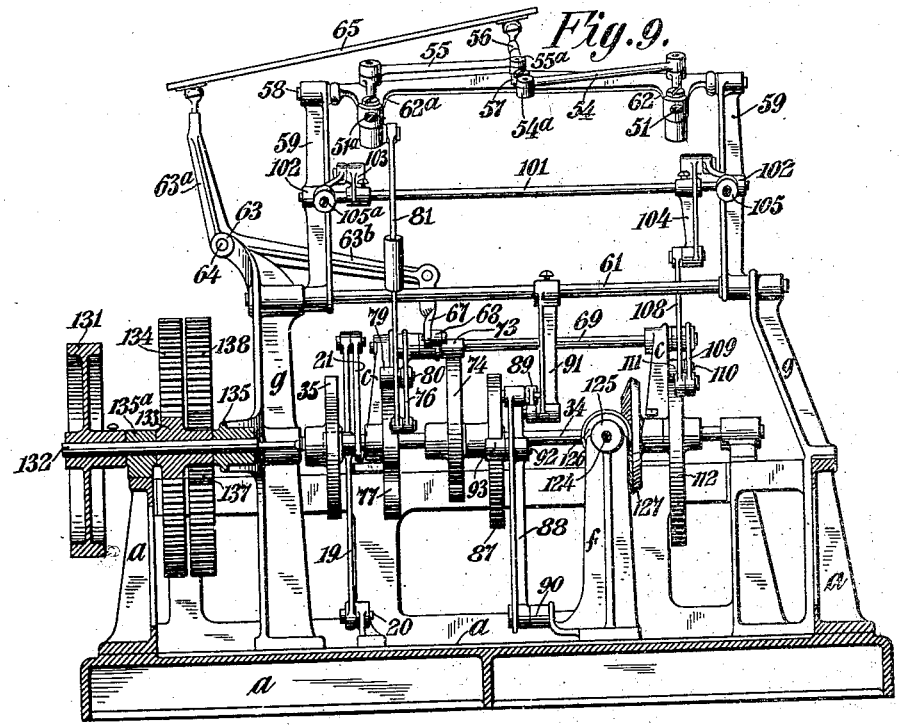
Figure 10:
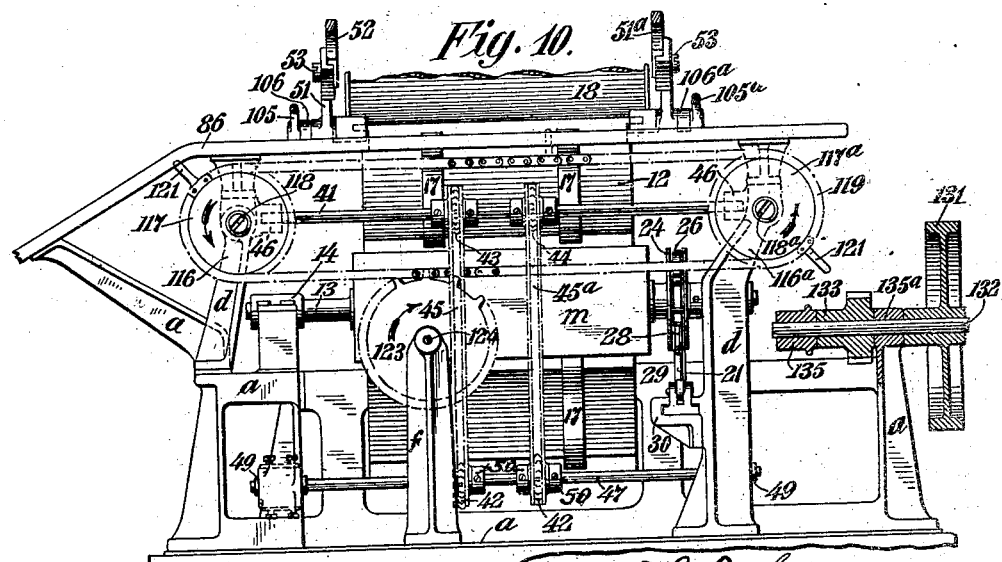
Figure 12:
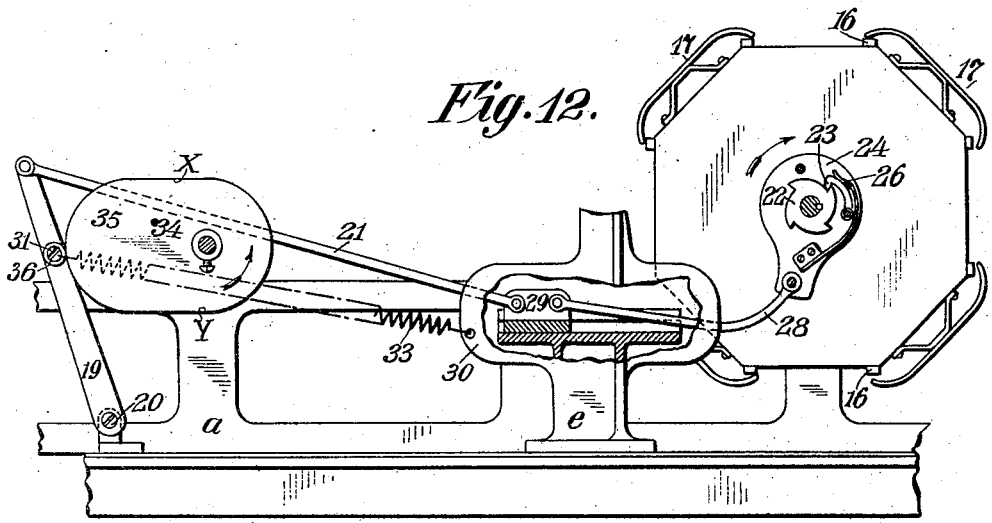
Figure 13:
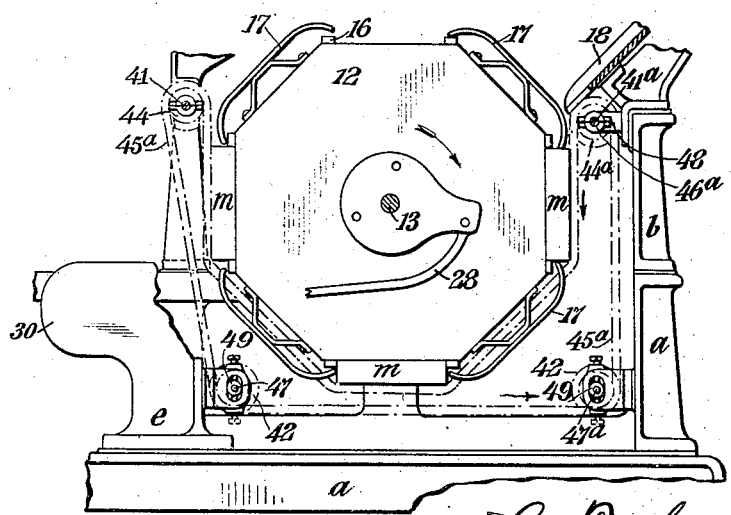

Figs. 6, 7 and 8 are fractional sectional views on lines 6—6, 7—7 and 8—8 respectively, indicated in Fig. 2; the Figs. 6 and 7 illustrate only the mechanism actuating the arms carrying the jaws, and Fig. 8 the mechanism turning the jaws, all other mechanisms being omitted; the relative positions of the parts of these mechanisms as they appear in Fig. 2, are shown in these figures in full lines, and their positions, when the arms are raised, and the jaws partly turned as shown in Figs. 3 and 4, are shown in dotted lines;

Fig. 9 is a sectional view, looking to the left, on line 9—9, indicated in Fig. 1, and Fig. 10 is a sectional view on the same line as Fig. 9, but looking to the right, this figure illustrating particularly the mechanism for moving the molds along the runway;

Figs. 11, 12 and 13 are fractional side views of the machine, illustrating the mechanism for intermittently turning the drum, and the appliances for holding the molds thereto.

My invention relates to appliances for applying sand, powder, or other similar substances to molds, used, for instance, in brick making, casting of metals, manufacture of artificial stone, etc., and consists of a machine, designed to perform, automatically, the work heretofore done by the hands of men particularly employed for the purpose. A machine, constructed according to my invention, as for instance, the machine illustrated in the accompanying drawings, designed for sanding brick-makers' molds, comprises, besides the rotating receptacle (drum) for the sand or brick powder to be applied to the molds, (1) means for depositing, successively, upon the openings in the drum, the fresh (unsanded) molds, (2) mechanism for intermittently rotating the drum, whereby the molds are filled with sand, and emptied again, and then brought into a position to be lifted from the drum, and transferred to the runway; (3) means for holding the molds in their position while the drum is rotated; (4) a pair of movable arms, to which gripping jaws are movably secured; (5) mechanism operating the arms and the jaws, to lift the molds, one after the other, from the drum, shaking each mold to remove the superfluous sand, or powder, therefrom; and then raising and moving each mold to, and depositing it on, a runway; (6) mechanism for moving the mold along the runway.

These component parts of the machine, and the driving mechanism therefor are mounted in a suitably shaped frame, the parts whereof are designated in the drawings by reference letters *a, b, c, d, e, f* and *g*, to better distinguish these parts from the movable, or operating, parts of the machine, which are designated by reference numerals.

The rotating receptacle for the sand or powder is formed as an octagonal cylinder, or drum 12, fixed to the shaft 13, the latter being rotatably mounted in suitable bearings 14, affixed to the frame. The ends of the drum are closed, and openings 15 are provided in the sides. These openings 15 conform in shape and dimensions to the molds to be sanded, and are provided with flanges 16, engaging the molds to better hold the latter in position upon the openings, and to prevent spilling of the sand, or powder, or other similar substance to be applied to the molds. The rails 17, affixed to the full sides of the drum 12, serve, incidentally, also for this purpose, their main purpose, however, is to hold the molds upon the slide 18 until the open side of the rotating drum 12 is brought in position to receive the mold.

The drum 12 is rotated intermittently, one-quarter of a revolution at each turn, and stands still during the intervals. During each quarter revolution of the drum 12, one fresh (unsanded) mold is taken up from the slide 18, and one sanded mold is brought to the top side of the drum. This position, required for the action of the jaws carrying arms 51 and 51ª, is shown in Fig. 1 in a side view, and in Fig. 2 in plan view.

The mechanism for thus rotating the drum 12 is constructed as follows:

A four pointed ratchet wheel 22 is fixed to the drum shaft 13, and a pawl frame 24 is rotatably mounted on the hub of the ratchet wheel 22; a pawl 23 is pivoted in the pawl frame 24, and its point is pressed upon the periphery of the ratchet wheel 22 by the curved spring 26, whose other end is secured to the pawl frame 24. The tail of the pawl frame 24 is connected by link 28 to cross-head 29, movably mounted on guideway 30. A lever 19 is hinged to a lug 20, fixed to the base $a$ of the machine; its upper end is pivotally connected by link 21 to the cross-head 29. A pin 31 is set in the lever 19, approximately midway between its end, and one end of the spring 33 is secured thereto, the other end of the spring 33 is connected to the rear post of the guideway 30, or may be connected to some part of the machine frame. Pin 31 extends through the lever 19, and its projecting part serves as a stud whereon the roller 36 is mounted. The eccentric cam 35 is fixed to the shaft 34 in position to act on the roller 36, which is held against it by the spring 33, and thus, when the shaft 34 is rotated, the cam 35, acting on the roller 36, swings the lever 19, and causes the link 21 to draw the cross-head 29 in the direction away from the drum 12. The link 28, connecting the cross-head 29 with the tail of the pawl frame, draws the latter in the same direction, and the pawl 23 being then in engagement with one of the four points of the ratchet wheel 22, the action of the cam 35 rotates the drum 12 one quarter of a revolution. The eccentricity of the cam 35 is determined to produce the required extent of this motion. The spring 33 tends to draw the lever 19 in the opposite direction, and thus, when the roller 36 has passed the apex of the eccentric portion of the cam 35, draws the lever 19 returning it to its normal, vertical position. During this return swing of the lever 19, propelled by the reaction of the spring 33, the link 21 pushes the cross-head 29 toward the drum 12. This reverse motion of the cross-head 29 is imparted by the link 28 to the pawl frame 24, which is thereby swung reversely relatively to the still standing ratchet wheel 22. During this reverse rotation of the pawl frame 24, the drum 12 and ratchet wheel 22 stand still, the point of pawl 23 slides on the periphery of the ratchet wheel 22. At the end of the reverse movement of the cross-head 29, and of the pawl frame 24, the point of the pawl 23 passes the next tooth of the ratchet wheel 22, and is pressed in engagement therewith by the spring 26. The part of the periphery of the cam 35 between the points marked X and Y in Fig. 11 of the drawing, is circular and concentric with the shaft 34. During the period, in which this part of the cam 35 contacts with the roller 36, the lever 19, the cross-head 29, the pawl frame 24 and the drum 12, stand still. When the eccentric portion of the cam 35 again begins to act on the roller 36, the lever 19 is started on its swing, the motion of the cross-head 29 is reversed, the link 28 acts on the pawl frame 24 as explained, and the pawl 23, being then engaged with the ratchet wheel 22, the drum is rotated again one-quarter of its revolution. While the drum 12 stands still in its position, during the reverse rotation of the pawl frame 24, and while the circular and concentric part of cam 35 contacts with the roller 36, the other mechanisms of the machine act upon the mold, which is then on the top side of the drum 12. These mechanisms and their operations are described and explained farther on.

The mechanism for holding the molds to the drum during the operation of applying sand thereto is shown in Figs. 10 and 11. This mechanism comprises the shafts 41 and 41ª, two pair of flanged sprocket wheels (or belt pulleys) 43, 43ª and 44 and 44ª fixed thereon, two endless chains (or belts) 45 and 45ª, and two pair of idlers 42, rotatably mounted on shafts 47 and 47ª, between collars 50. Shafts 47 and 47ª are journaled in adjustable bearings 49 of the machine, one on each side of the drum 12. The shaft 41 is rotatably mounted in bearings 46, affixed to the posts $d$ of the frame of the machine; the shaft 41ª is rotatably mounted in bearings 46ª, fixed on brackets 48, formed on the machine frame; the sprocket wheels 43 and 44 are fixed to the shaft 41, and the sprocket wheels 43ª and 44ª to the shaft 41ª, the sprocket wheels 43ª and 44ª being set in alinement with the sprocket wheels 43 and 44 set on the shaft 41. The endless chains 45 and 45ª are slung over the sprocket wheels 43—43ª and 44—44ª, and over the idlers 42, one over each set. Their run between the sprocket wheels, mounted on the shafts 41 and 41ª, corresponds to about three-fifths of the circumference of the drum 12 with the molds set in their positions over the openings in its sides; the idlers 42 serve to prevent contact of this run of the chains with the oppositely moving outer run. The chains coöperate with the flanges 16 and rails 17 in holding the molds against the drum 12 when the latter is rotated, and prevent the molds from falling off, of the drum, besides supporting the weight of the sand or powder, filling the molds.

The jaws carrying arms, and the mechanism actuating the arms and the jaws, may best be described with reference to Figs. 1 to 9 of the drawings. The arms 51 and $51^a$ are rigidly secured by bolts 53 to levers 52 and $52^a$. They may be made integral therewith, but it is thought to be preferable to make the arms separable from the levers to facilitate their adjustment, and, eventually, also the use of arms of a different shape or different dimensions. The levers 52 and $52^a$ are pivotally connected to links 54 and 55 respectively, and these links are again pivoted at $54^a$ and $55^a$ to the rocking lever 56; link 55 at the end of lever 56 and link 54 approximately midway between its ends. The rocking lever 56 is fulcrumed at 57, midway between the pivotal joints $54^a$ and $55^a$, to rockshaft 58, journaled in posts 59, fixedly set on the rockshaft 61 journaled in the frame of the machine; the levers 52 and $52^a$ are pivoted at 60 and $60^a$ respectively, to the brackets 62 and $62^a$, secured to, or made integral with, the rockshaft 58. By this construction the jaws carrying arms 51 and $51^a$ are made movable in unison toward each other, or away from each other, also forwardly and rearwardly, and up and down.

The moving of the arms 51 and $51^a$ toward each other, and apart again, is effected by the bell crank 63, pivoted to the post 64, and having its upwardly extending arm $63^a$ connected by a ball and socket joint to one end of link 65, whose other end is connected, also by a ball and socket joint, to the lever 56. The horizontally extending arm $63^b$ of the bell crank lever 63 is pivotally connected by link 67 to the lever 68 near its end, to which the spring 71 is connected; the other end of lever 68 is hinged to the rod 69. The other end of spring 71 is secured to the lug 70 set in the base of the machine. The roller 73 is rotatably mounted on stud 72, set in the lever 68, and is held, by the spring 71, in contact with the cam 74, fixed to the cam-shaft 34. Cam 74 is appropriately shaped to raise the lever 68, the spring 71 drawing it down again. These motions of the lever 68 are transmitted, by the link 67, to the bell crank lever 63, and by the link 65 to the lever 56, swinging it on its pivot. The movements of lever 56 are imparted by links 54 and 55 to the levers 52 and $52^a$, by which the jaws carrying arms 51 and $51^a$ are moved together, or apart from each other. These motions are timed to occur in concert with the actions of the other mechanisms operating the arms 51 and $51^a$, and with the actions of the mechanisms actuating the other movable parts of the machine.

The arms 51 and $51^a$ are raised and lowered by the lever 76, operated by the cam 77, which is fixed on the shaft 34, in position to act upon the roller 79, rotatably mounted on the stud 80, set in lever 76, approximately midway between its ends. The rear end of lever 76 is hung on the rod 69, and its forward end is pivotally joined to the lower end of post 81, whose other, upper end, is pivoted to one of the brackets 62, whereon the jaws carrying arms 51 and $51^a$ are supported. The shape of cam 77, and its position on the cam-shaft 34, determine the time and extent of the movements, raising and lowering the arms 51 and $51^a$, and these movements are timed to occur in the order of, and relatively to, the movements of the other mechanisms.

The shaking of the molds is produced by the same mechanism raising and lowering the arms 51 and $51^a$. The cam 77 has two lifting protuberances, 83 and 84, and two recesses, $83^a$ and $84^a$, each immediately following one of the two protuberances. The protuberance 83 acts first on the lever 76 producing a slight raising of the arms 51 and $51^a$. This occurs immediately after the jaws have gripped the mold to be removed from the drum 12. The depression $83^a$, immediately following the protuberance 83, produces an abrupt dropping of the arms 51 and $51^a$, whereby the mold gripped in the jaws is shaken, and all superfluous sand, or powder, adhering to the mold, shaken off and returned to the drum 12 through the opening from which the mold was lifted.

The mechanism moving the jaws carrying arms 51 and $51^a$ forward, or toward the drum, to take up the mold, and then rearward again, away from the drum, to carry the mold to the runway 86, is actuated by the cam 87, spring 96, lever 88 and link 89, the latter connecting the lever 88 with the arm 91, fixed to the rockshaft 61. The lower end of the lever 88 is hinged to lug 90, fixed in the base of the machine. The roller 93, revolubly mounted on stud 92, set in the lever 88 near its other end, is held in contact with the periphery of the cam 87 by the tension of the spring 96, whose one end is secured to the rod 69, while its other end is connected with the free end of lever 88. This free end of lever 88 is thus moved to and from by the cam 87 and the spring 96, the time and extent of these motions being determined by the shape and dimensions of the cam 87, and by its position on shaft 34. The oscillating motions of lever 88 are transmitted by the link 89 to the arm 91, and thereby actuate the rockshaft 61, to which the posts 59, whereon the rockshaft 58 and brackets 62, supporting the arms 51 and 51ª are mounted. The jaws carrying arms are thus moved forwardly and rearwardly, these movements occurring in concert with the motions effected by the other coöperating mechanisms moving the arms 51 and 51ª and turning the jaws 98 and 98ª pivoted thereto.

The turning of the jaws is effected by the coöperation of the previously described mechanisms for raising and lowering, and for reciprocating the jaws carrying arms 51 and 51ª, with mechanism constructed as follows:

The rockshaft 101 is journaled in bearings 102, affixed to the posts 59, which are rigidly mounted on rock-shaft 61. Two arms, 103 and 104, the latter being one arm of a bell crank lever, are fixed to the rockshaft 101, and their free ends are pivotally connected, by links 105 and 105ª, to cranks 106 and 106ª. The other ends of these cranks 106 and 106ª are rigidly affixed to pivots 107 and 107ª, revolubly set in the free ends of arms 51 and 51ª, and having the jaws 98 and 98ª fixed thereto. The other arm of bell crank lever 104 is pivotally connected by link 108 to lever 109, whose other end is hinged on rod 69. The stud 110 is set approximately midway between the ends of the lever 109, and the roller 111 is rotatably mounted thereon. The cam 112 is secured to the cam-shaft 34 in position to contact with the roller 111, and a spring 113, whose one end is connected to the lug 114, set in the base of the frame of the machine, and its other end to the lever 109, draws the latter down and holds roller 111 against the cam 112. This cam 112 is so positioned upon the shaft 34, relatively to the cams 77 and 87, that the mechanism for turning the jaws is set in motion to start the links 105 and 105ª forwardly when the free ends of arms 51 and 51ª are being raised, after the mold is gripped by the jaws 98 and 98ª, and shaken as hereinbefore explained. The forward movement of the links 105 and 105ª is continued during the upward swing of the arms 51 and 51ª, the jaws 98 and 98ª being thereby turned approximately 90° from the axial line of the arms 51 and 51ª. During the then following retrograde movement of the arms 51 and 51ª the cam 112 continues to raise the lever 109, and then holds it in its raised position during the descending swing of the arms 51 and 51ª toward the runway 86. Thereby a further turning of the jaws 98 and 98ª (90°) is effected. The mold, which was taken up from the drum "bottom up" is thereby turned over 180° and held "right side up". At this point the arms 51 and 51ª are moved apart, withdrawing the jaws 98 and 98ª from the mold, and raised. The mold is thereby placed upon the runway 86 to be moved along to its final destination. The reverse turning of the jaws 98 and 98ª is commenced with the raising of the arms 51 and 51ª, and is completed when the ends of the arms 51 and 51ª descend again to the next mold to be taken up by the jaws.

The mechanism for moving the molds along the runway is illustrated in Fig. 10 of the drawings. Two sprocket wheels 117 and 117ª are rotatably mounted underneath the runway 86 on studs 118 and 118ª, set in posts 116 and 116ª forming part of the frame of the machine. The chain 119, stretched over the sprocket wheels 117 and 117ª, carries the thumbs 121, secured thereto at intervals corresponding to the dimensions of the molds. The chain 119 passes close to, and in alinement with, the runway 86, wherein a longitudinal slot 122 is provided in line therewith. The thumbs 121 are made of sufficient dimensions to project, through the slot 122, above the bottom of the runway 86. The chain 119 is propelled, in the direction indicated by the arrow in Fig. 10, by the sprocket wheel 123, keyed to the transmission shaft 124, journaled in bearings 125 and 125ª set in the frame of the machine. The bevel gear 126, set on the other end of shaft 124, meshes with the bevel gear 127 keyed to the cam-shaft 34. These gears, and the sprocket wheels 118, 118ª and 123, are proportioned to move the thumbs 121, which stand in the position shown in Fig. 10, when the mold is deposited on the runway 86, with sufficient speed to transfer the mold to the inclined part of the runway 86, along which it is propelled by gravity, while the arms 51 and 51ª are brought forward to lift the next mold from the drum 12 and receded again, carrying it to the runway. The runway 86 is flanged, the flanges assisting in the orderly movement of the molds, and preventing transverse displacement thereof in case of accidental obstruction in their path.

*The driving gear.*—The machine is driven by a belt passed from an engine, or other motor, over the pulley 131, keyed to the shaft 132, journaled in bearings 135 and 135ª, set in the frame of the machine. The cog-wheel 133, keyed to the shaft 132, meshes with the cog-wheel 134, fixed to the intermediate shaft 136, to which also the small cog-wheel 137 is affixed. This cog-wheel 137 is geared to the cog-wheel 138, keyed to the cam-shaft 34, which is the driving shaft of the operating mechanisms of the machine. The pulley 131, fixed to the shaft 132, is formed to serve as a fly-wheel to stabilize the running of the cam-shaft 34, and of the mechanisms actuated by the several cams fixed thereon.

*The operation of the machine.*—This machine is designed to perform, automatically, the work heretofore performed by manual labor. The experimental machine which I have constructed, and from which the drawings, forming part of these specifications, were made, demonstrates its ability to perform the sanding or powdering of molds more effectively than it is being done by manual labor, and in a much larger volume, whereby the costs of this work are greatly reduced. On starting the machine, the molds $m$ are first applied to three of the four openings of the drum 12, which is then partly filled with the sand, brick dust, or powder, whichever is to be used, through the fourth, uncovered opening. Then a supply of the molds to be sanded or powdered is piled upon the slide 18. The molds are placed in the position shown in Fig. 1, the lowermost mold resting against the rails 17 on the full side of the drum next to the end of slide 18. The drive of the machine is then started, and when the drum 12 is rotated one-quarter of a revolution, the opening, through which the sand or powder, etc., was charged into the drum, is moved underneath the lowermost mold. This mold then drops onto the opening, the rails 17 which held it having been moved by the turning of the drum 12; the sides of the mold engage with the flanges 16 surrounding the opening. As the drum 12 is rotated farther, the mold is engaged by the endless chains 45 and 45$^a$, holding it against the drum, the sand or powder charged into the drum 12 falls into the mold (and into each successively following one) and back into the drum again, as the revolution of the drum progresses. As each mold is brought to the top of the drum 12 (the position shown in Fig. 1) the arms 51 and 51$^a$, having been in the meantime moved forwardly and downwardly, are on the level with the mold, and laterally in line therewith. The jaws 98 and 98$^a$ are then also in line with the mold. Then the mechanism moving the arms 51 and 51$^a$ together and apart comes in action; the arms are moved together and the jaws grip the mold. After the mold is gripped by the jaws 98 and 98$^a$, as above explained, the mechanism raising and lowering the arms 51 and 51$^a$ acts, raising the arms with the mold above the opening from which the mold is being removed, and then abruptly dropping them again. Thereby all superfluous sand or powder, which may be adhering to the mold is shaken out from the mold and returned to the drum 12. Then again the mechanisms operating the arms 51 and 51$^a$ comes in action; the arms, with the mold gripped by the jaws, are raised and moved rearwardly and then downwardly again, bringing the mold to the runway 86, whereupon the arms 51 and 51$^a$ are moved apart, the mold being thereby released from the jaws 98 and 98$^a$ and deposited upon the runway 86, where it is then engaged by the thumbs 121 and removed from the machine. While being thus transferred to the runway 86 the mold is completely turned over by the hereinbefore described co-action of the mechanisms, those moving the arms 51 and 51$^a$, and the mechanism for turning the jaws 98 and 98$^a$, so that the mold, which was taken "bottom up" from the drum 12 is deposited "right side up" on the runway.

I claim as my invention:

1. A machine for applying sand, powder and the like to molds, comprising a frame, a hollow drum, having suitable openings in its sides, rotatably mounted in the frame; mechanism for intermittently rotating the drum; means for holding the molds thereto; a pair of arms, movably mounted in the frame and provided with gripping means on their free ends; and automatically operating mechanisms, actuating the arms to grip, lift and shake, and then remove each mold brought to the top side of the drum when the operation of applying thereto of sand, powder or the like is completed; substantially as herein shown and described.

2. A machine for applying sand, powder and the like to molds, comprising a frame, a hollow drum, having suitable openings in its sides, rotatably mounted in the frame; mechanism for intermittently rotating the drum; means for holding the molds thereto; a pair of arms movably mounted in the frame and provided with gripping means on their free ends; and mechanisms, operatively connected with the arms, for moving the arms toward the drum, then down and toward each other to take up the mold on the top side of the drum, then moving the arms up and away from the drum, and away from each other to release the molds removed from the drum; substantially as herein shown and described.

3. A machine for applying sand, powder and the like to molds, comprising a frame, a hollow drum, having suitable openings in its sides, rotatably mounted in the frame; mechanism for intermittently rotating the drum; means for holding the molds thereto; a runway; a pair of arms movably mounted in the frame and provided with gripping means on their free ends; mechanisms, operatively connected with the arms, for moving the arms toward the drum, then down and toward each other, then up and toward the runway, and then away from each other, to deposit the mold, removed from the drum, upon the runway, and mechanism for moving the molds along the runway; substantially as herein shown and described.

4. A machine for applying sand, powder and the like to molds, comprising a frame, a hollow drum, having suitable openings in its sides, rotatably mounted in the frame; mechanism for intermittently rotating the drum; means for holding the molds thereto; a pair of arms movably mounted in the frame; gripping jaws, pivoted to the free ends of the arms; mechanisms, operatively connected to the arms, and to the jaws, moving the arms toward the drum, and the jaws in line therewith, then moving the arms down and toward each other, to grip the mold on the top side of the drum, then upward and away from the drum, to remove the mold from the machine, simultaneously revolving the jaws to reverse the mold, and then moving the arms apart to release the mold: substantially as herein shown and described.

5. A machine for applying sand, powder and the like to molds, comprising a frame, a hollow drum, having suitable openings in its sides, rotatably mounted in the frame; mechanism for intermittently rotating the drum; means for holding the molds thereto; a runway; a pair of arms movably mounted in the frame; gripping jaws, pivoted to the free ends of the arms; mechanisms, operatively connected to the arms, and to the jaws, moving the arms toward the drum, and the jaws in line therewith, then moving the arms down and toward each other, to grip the mold on the top side of the drum, then upward and toward the runway, simultaneously revolving the jaws to reverse the mold, and then moving the arms apart to release the mold removed to the runway, and mechanism for moving the molds along the runway: substantially as herein shown and described.

6. A machine for applying sand, powder and the like to molds, comprising a frame, a hollow drum, having suitable openings in its sides, rotatably mounted in the frame; mechanism for intermittently rotating the drum; means for holding the molds thereto; a pair of arms movably mounted in the frame and provided with gripping means on their free ends; and mechanisms, operatively connected with the arms, one for moving the arms up and down, one for moving them forward and rearward, and one for moving the arms together and apart from each other; a driven shaft, and means on the shaft actuating each of the aforesaid mechanisms in a predetermined cycle, moving the said arms toward the drum, and downward, and to move the arms together when the drum stands still to take up the mold on the top side of the drum, then moving the arms up and away from the drum, and away from each other to release the molds removed from the drum; substantially as herein shown and described.

7. A machine for applying sand, powder and the like to molds, comprising a frame, a hollow drum, having suitable openings in its sides, rotatably mounted in the frame; mechanism for intermittently rotating the drum; means for holding the molds thereto; a pair of arms movably mounted in the frame; gripping jaws, pivoted to the free ends of the arms; mechanisms operatively connected to the arms, and to the jaws, one for moving the arms up and down, one for moving them forward and rearward, one for turning the jaws, and one for moving the arms together and apart from each other; a driven shaft, and means on the shaft actuating each of the aforesaid mechanisms in a predetermined cycle, to move the said arms toward the drum, and downward, and the jaws in line therewith; then to move the arms together, the drum then standing still, then upward and away from the drum, to remove the mold from the machine, simultaneously revolving the jaws to reverse the mold, and then moving the arms apart to release the mold; substantially as herein shown and described.

8. A machine for applying sand, powder and the like to molds, comprising a frame, a hollow drum, having suitable openings in its sides, rotatably mounted in the frame; mechanism for intermittently rotating the drum; means for holding the molds thereto; a runway; a pair of arms movably mounted in the frame; gripping jaws, pivoted to the free ends of the arms; mechanisms, operatively connected to the arms, and to the jaws, one for moving the arms up and down, one for moving them forward and rearward, one for turning the jaws, and one for moving the arms together and apart from each other; mechanism for moving the molds along the runway; a driven shaft, and means on the shaft, actuating each of the aforesaid mechanisms in a predetermined cycle, to move the said arms toward the drum, and downward, and the jaws in line therewith; then to move the arms together, the drum then standing still, then upward and toward the runway, simultaneously revolving the jaws to reverse the mold, and then moving the arms apart to release the mold when deposited on the runway, and also actuating the mechanism for moving the molds along the runway to remove the molds from the machine; substantially as herein shown and described.

WILLIAM C. TUTHILL.

Witnesses:
PAULA BATES,
LOUISE KELLER.

Copies of this patent may be obtained for five cents each, by addressing the "Commissioner of Patents, Washington, D. C."